United States Patent

[11] 3,588,201

| [72] | Inventor | Heinrich K. Schmidt<br>Levittown, Pa. |
|---|---|---|
| [21] | Appl. No. | 855,627 |
| [22] | Filed | Sept. 5, 1969 |
| [45] | Patented | June 28, 1971 |
| [73] | Assignee | Roller Bearing Company of America<br>Trenton, N.J.<br>Continuation-in-part of application Ser. No.<br>712,355, Mar. 12, 1968. |

[54] SEALED SELF-ALIGNING PLAIN BEARING
3 Claims, 9 Drawing Figs.

| [52] | U.S. Cl. | 308/36.1, 277/169 |
|---|---|---|
| [51] | Int. Cl. | F16c 1/24 |
| [50] | Field of Search | 308/36.1, 29, 72, 140, 187.1, 12; 277/94, 169, 233 |

[56] References Cited
UNITED STATES PATENTS

| 2,711,352 | 6/1955 | Hasko et al. | 308/72 |
| 2,755,113 | 7/1956 | Baumheckel | 308/187.1 |
| 2,872,219 | 2/1959 | Cobb | 277/169 |

FOREIGN PATENTS

| 1,448,175 | 6/1966 | France | 308/187.2 |

Primary Examiner—Fred C. Mattern, Jr.
Assistant Examiner—Wesley S. Ratliff, Jr.
Attorney—Jackson, Jackson & Chovanes ABSTRACT: The subject matter of the invention is a self-aligning plain bearing which has inwardly directed annular grooves at the ends of the socket opposite the ball, and which retains within the grooves composite sealing rings consisting of a metal ring and a ring of elastomeric rubber or synthetic rubber, which is bonded to the metal ring.

The invention applies particularly to a socket which has only one axial fracture in its circumference. The rubber extends over the metal ring at the radial outside and holds it in an inwardly directed annular groove of the socket and extends over the metal ring at the radial inside forming a sealing lip which engages the outside of the ball.

PATENTED JUN 28 1971

INVENTOR.
Heinrich K. Schmidt
BY Jackson, Jackson and Chovanes
ATTORNEYS

PATENTED JUN 28 1971

INVENTOR.
Heinrich K. Schmidt
BY
Jackson, Jackson and Chovanes
ATTORNEYS

SEALED SELF-ALIGNING PLAIN BEARING

DESCRIPTION OF INVENTION

This application is a continuation-in-part of my copending application Ser. No. 712,555, filed Mar. 12, 1968 for Sealed Self-Aligning Plain Bearing.

The present invention relates to a sealed self-aligning plain bearing.

A purpose of the invention is to seal at the ends of a self-aligning plain bearing by a composite metal and elastomer sealing ring bonded together, there being elastomer retaining the ring at the radial outside by engagement in an inwardly directed annular groove in the socket.

A further purpose is to provide a lip at the inside of the sealing ring composed of elastomer and extending inwardly of the metal ring.

A further purpose is to guide the composite sealing ring into position at the end of the bearing by a converging annular guide so that the sealing ring can be pushed into position.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 2:
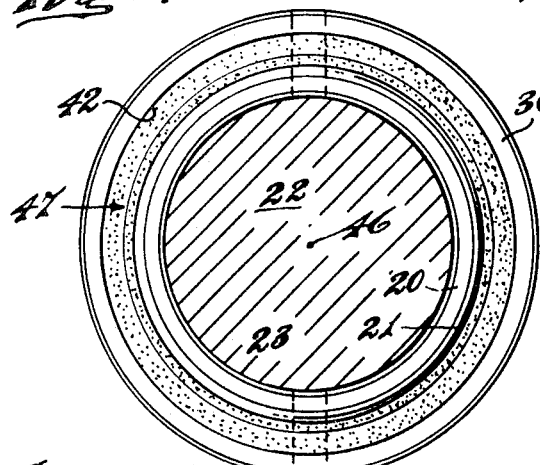
FIG. 2 is an end elevation of the bearing of FIG. 1, omitting other parts.

There are numerous applications for self-aligning sealed bearings, consisting of an interior spherical race called a ball engaging an exterior spherical race called a socket. They are used primarily for installations in which one element rotates with a certain amount of misalignment with respect to the other element, or in which care in assembling to properly align the bearing will not always be employed, as where misalignment will occur from distortion, as, for example, in welding, casting, heat treating or otherwise, or where parts may be bent to become misaligned, as due to an accident.

The ball and the race of self-aligning plain bearings are preferably made of a hardened steel such as AISI 52100. Where such hardened materials are used, it is common to assemble the parts by cracking or splitting the socket at two opposed points, or by cracking or splitting the socket at one point, opening it up sufficiently to insert the ball and then allowing the inherent spring of the socket to cause the socket to contract and grip the ball. Zurick U.S. Pat. No. 3,127,664, granted Apr. 7, 1964, for Method for Fracturing Sockets of Ball and Socket Bearings.

In another form the socket is made of a metal alloy such as relatively soft steel which can undergo cold work and it is placed in position around the ball and swaged so that it can grip the ball. In another form the race is made large enough to slip around the ball and the ends are closed by inserts which are permanently fitted in between the socket and the ball.

Many self-aligning plain bearings are used on vehicles, mining equipment, and in other installations where exposure to dust and dirt is likely to be encountered. It is, therefore, considered proper in many cases to introduce lubrication seals at the ends.

The most common lubrication seal is accomplished by inwardly directed annular grooves in the socket directed toward the ball in which the elastomeric annular packing ring such as an O-ring is inserted into the double fractured socket. Industriewerk Schaeffler oHG, German Gebrauchsmuster 1,869,880, dated Nov. 16, 1962. A somewhat similar construction is shown in Ricefield U.S. Pat. No. 2,758,365, dated Aug. 14, 1956, except that in this form the packing ring has a metal ring at the outside and an elastomer at the inside and the metal ring is held by peening the socket.

The insertion of O-rings into a double fractured socket has proved to be difficult, and time consuming. The O-rings are laid first in one half of the socket with the ball also laid in. By closing the bearing with the other half of the socket it is difficult to lead the O-rings into the respective grooves of the other socket half because the O-rings are lacking any stiffness whatsoever and have to be guided by hand to fit the grooves. In case of the present invention, by using a single fractured socket according to U.S. Pat. No. 3,127,664, the socket and ball will be assembled first as before mentioned and the steel reinforced elastomer seals can easily be snapped into the grooves at both ends either by hand or automatically.

Various other means have been developed to hold the metal seal. Helmut Elges KG German Gebrauchsmuster 1,901,908, dated June 19, 1964.

SKF Kugellagerfabriken GmbH German Gebrauchsmuster 1,922,800, dated June 19, 1965 seals at the end by an inner metal ring which actually engages the shaft and an outer sealing ring which engages the interior of the socket and the end of the ball but does not fit into a groove in the socket.

Many of these prior art lubrication seals present the problem of difficulty of insertion and also are not very effective and long lasting.

The present invention contemplates a lubrication seal for a self-aligned plain bearing which will be inserted more readily and reliably, and which will be less subject to damage in insertion. The invention applies particularly to a socket having only one axial fracture in its circumference.

Another advantage of the seal of the present invention is that it will not require separate insertion of metallic and elastomeric parts.

A further advantage of the seal of the invention is that it is stiff radially and is not likely to collapse and fail to perform its sealing function.

A further advantage of the invention is that double lip seals are provided by the sealing rings in a preferred embodiment.

As shown in the drawings, the self-aligning bearing of the invention comprises a ball 20 having a spherical exterior surface 21 and mounted in any suitable way, conveniently by slipping it on a shaft 22 which extends through a cylindrical internal opening 23, the shaft being secured at the ends as by a nut 24 pulling a portion of the structure 25 of any suitable piece of machinery, conveniently one of a pair of lever arms, as shown, the other end of the shaft retaining the opposing lever arm by a head, not shown.

The ball is surrounded and engaged by a socket 30 having a spherical internal surface 31, which is mounted in any suitable way, as for example, by pressing its exterior cylindrical surface 32 into a cylindrical bore 33 of a cooperating element 34 of a piece of machinery, or the like.

It will be understood that the invention contemplates that the socket may be, like the ball, of hardened steel, for example, AISI 52100, or the parts may be partially or wholly of a softer metal. Likewise, it will be evident that the socket is axially cut or cracked at one point for the purpose of assembly, the embodiment shown having a crack at 35 at a suitable point in the socket so that the socket can be expanded and then can contract and grip the ball. Of course, the metallic bearing parts may be of a nonferrous metal such as bronze.

Any suitable lubrication means can be provided cooperating with any suitable lubrication fittings in the mounting structure. For convenience, I show a lubrication groove 36 around the cylindrical exterior surface of the socket which communicates through a lubrication hole 37 with a lubrication groove 38 extending around the spherical portion of the ball, communicating through a lubrication opening 40 with a lubrication groove 41 extending around the cylindrical interior surface of the ball. A lubrication fitting 39 on the element 34 feeds lubrication such as grease to the bearing through a port 39'. It will be evident that it is immaterial whether the lubrication holes are in alignment since they are in communication through the lubrication groove 38 and receive lubrication at the outside through the lubrication groove 36.

At both ends of the socket there is a seal groove 42 extending in from the end and forming at the outside an inwardly directed annular seal-receiving recess 43. Toward the end of the socket at each end there is a shallow rim 44 extending radially inwardly of the seal-receiving recess 43. On the side of the seal-receiving recess 43 toward the middle there is a shoulder 45 which extends annularly and inwardly, preferably in the general direction of the ball center 46.

Figure 1:
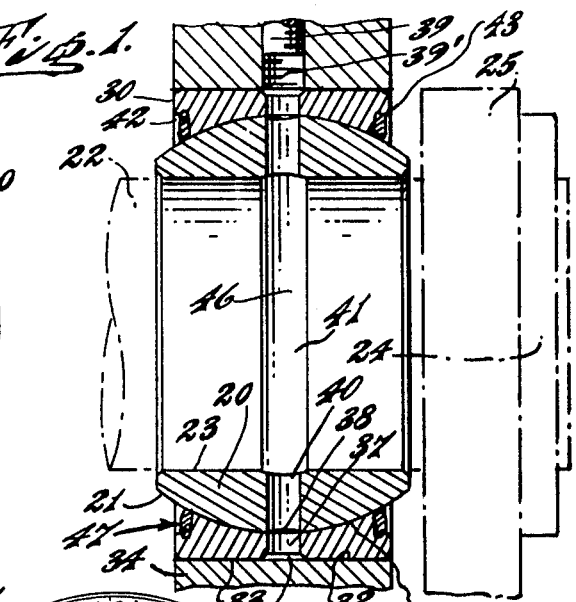
FIG. 1 is an axial section of a sealed self-aligned plain bearing according to the invention, mounted in a typical installation.
Figure 3:
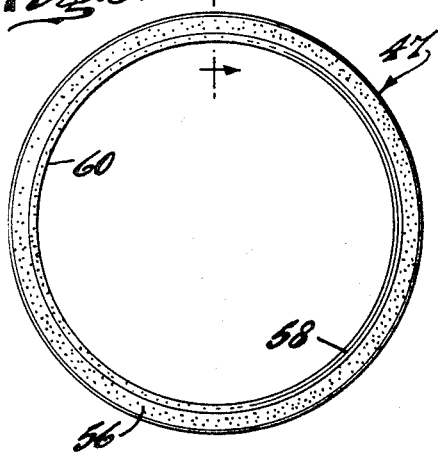
FIG. 3 is an outside elevation of the sealing ring of the invention.
Figure 4:
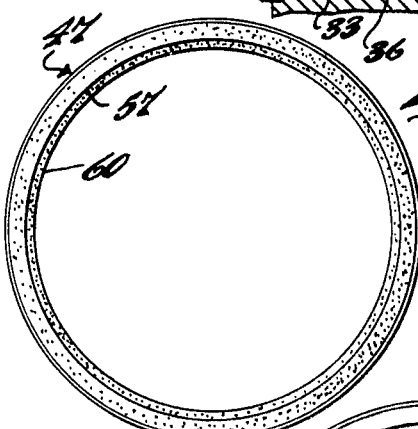
FIG. 4 is an inside elevation of the sealing ring of the invention.
Figure 6:
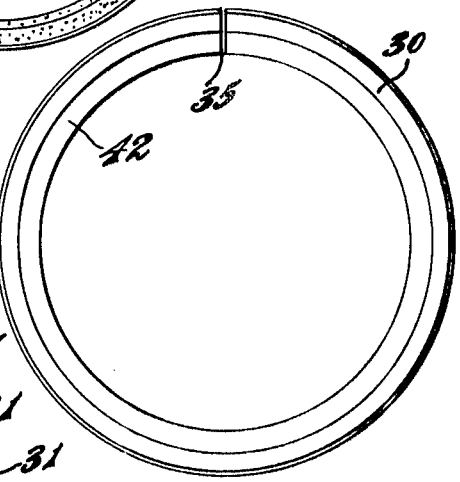
FIG. 6 is an end elevation of a socket for a bearing of the invention, shown split to fit on a ball.

The parts of the seal-receiving groove and the adjoining rib and shoulder as shown in FIG. 1 are symmetrical around the circumference.

Figure 8:
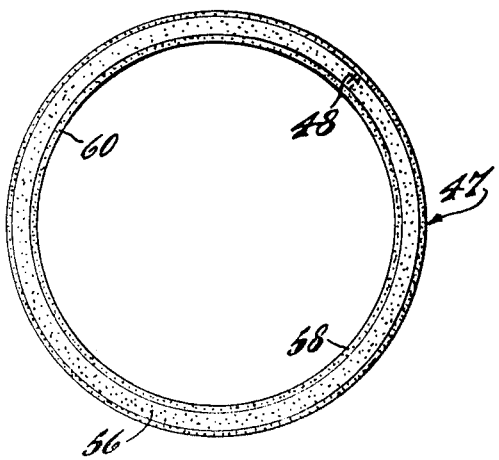
FIG. 8 is an end elevation of a variation in the sealing ring of the invention.

Engaged in the seal-receiving groove is a composite lubrication seal 47 which is preferably an annularly endless ring and as shown in FIG. 8, the metallic insert 50 may be interrupted at a suitable point 48 to permit a certain flexibility during insertion of the seal.

The ring 47 comprises a metallic ring 50 of a resilient material, suitably heat treated or cold worked steel or a non-ferrous material such as bronze, the metallic ring 50 being conveniently deeper on its radial side 51 than the thickness 52 and extending over most of the distance between the radial outside of the seal-receiving groove 43 and the radial inner surface of the ball immediately radially opposite that point.

An elastomer ring 53 is bonded to the metallic ring 50, by any suitable means such as comolding, the elastomer being desirably a material having suitable lubricant resistance such as neoprene. The elastomer ring 53 extends over the radial outer portion of the metallic ring at 54 and over the radial inner portion of the metallic ring at 55 and preferably extends continuously radially between the outer portion 54 and the inner portion 55 as shown at 56. In the preferred embodiment the elastomer portion 56 is located at the outside of the bearing or toward the end of the bearing so that the elastomer portion 56 protects the metallic ring 50 against exposure to the elements. The elastomer ring will also preferably extend over the surface of the metal ring 50 toward the middle of the bearing as at 59.

In the preferred form the elastomer ring at the radial inner portion adjoining the outside has an extended lip 57 integral with the rest of the elastomer ring. In relaxed position the lip 57 has located toward the end of the bearing a tapered annular surface 58 which terminates at the inside in a reduced lip 60. The lip 57 is desirably thinned at the inside at 58'.

Figure 9:
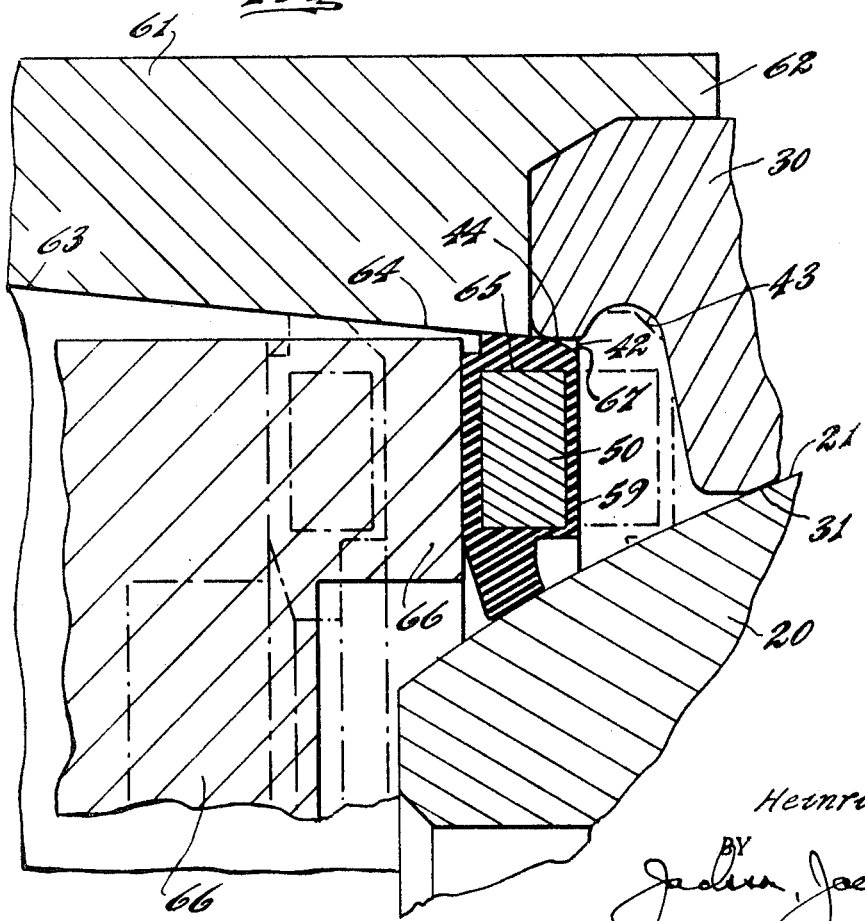
FIG. 9 is a fragmentary axial section showing insertion of the sealing ring in a bearing.

In order to insert the sealing ring in the groove at the end of the socket after the bearing proper has been assembled, an annular guide 61 (FIG. 9) is aligned with the annular groove 42, conveniently by fitting its annular rim 62 over the outside circumferential surface 32 of the socket. There is an opening through the interior of the guide which has an enlarged approach surface 63 which will receive the sealing ring, and then inwardly tapering ring surface 64 which at the inside reaches a diameter approximating the inside diameter of the rim 44.

The outside diameter of the metallic ring 50 at 65 is slightly smaller than the inside diameter of the rim 44, so that a punch 66 can force the sealing ring into seating relation, the outer elastomer portion 54 snapping over the rim 44 into the seal-receiving recess 43. This motion is aided by the bevel 67 on the outer corner of the sealing ring facing toward the socket.

Figures 5, 7:
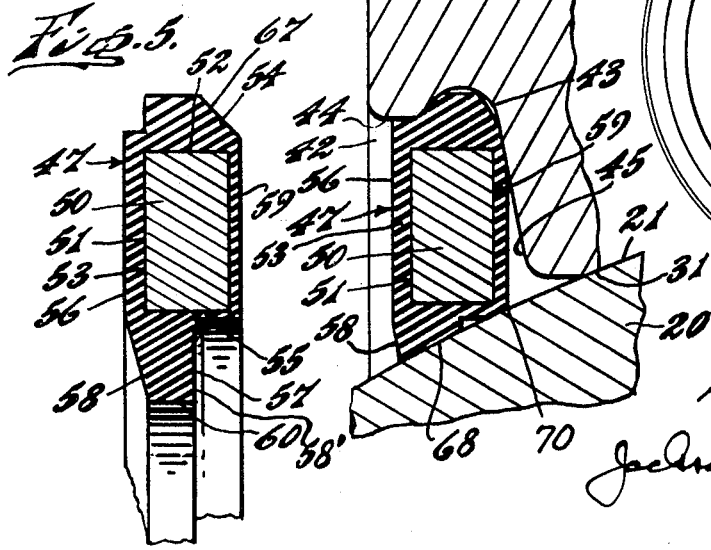
FIG. 5 is an enlarged fragmentary cross section of the sealing ring of the invention.
FIG. 7 is an enlarged fragmentary axial section showing a sealing ring in place in a bearing.

As this happens the lip 57 deflects to tightly engage the ball, as shown at 68. In the preferred embodiment each sealing ring deflects to tightly engage the outside of the ball at an outer lip 57 whose engagement is shown at 68 in FIG. 7 and also at an inner lip whose engagement is shown at 70 with respect to the midlength section.

In view of my invention and disclosure, variations and modifications to meet individual whim, or particular need will doubtless become evident to others skilled in the art to obtain all or part of the benefits of my invention without copying the structure and method shown and I, therefore, claim all such insofar as they fall within the reasonable spirit and scope of my claims.

Having thus described my invention what I claim as new and desire to secure by Letters Patent is:

I claim:

1. In a sealed self-aligning plain bearing, a ball having an outer surface which is a portion of a sphere, a one-piece socket having an inner surface cooperating with the spherical outer surface portion on the ball, the socket having only one axial fracture in its circumference, the socket having at each end an annular groove directed toward the ball, forming a seal-receiving recess, the socket having on the side of each recess toward the midlength section a wall extending inwardly as far as to the ball and adapted to function as a limiting abutment, there being an annular rim between each recess and the adjoining end of the socket, and an elastically deformable integral snap sealing ring filling the space between each seal-receiving recess and the ball and adapted to enter and lock itself in said space by elastic deflection, each sealing ring having a metallic ring embedded in the sealing ring extending around the same which metallic ring terminates at the radial outside inwardly of the rim and which metallic ring terminates at the radial inside outwardly of the ball, and having in bonded relation to the metallic ring an elastomer sealing ring which has an elastic portion extending from the radial outside of the metallic ring into the seal-receiving recess anchoring the sealing ring in place, extending over the end of the metallic ring at the axial outside of the seal and extending at the radial inside beyond the metallic ring into sealing engagement abutting against the ball, the elastomer sealing ring in relaxed position having a lip extending inward and having an inward edge of reduced thickness, said lip in assembled position deflecting into conformity with the shape of the outer surface of the ball, the opening between annular rim and ball surface being sufficient in size to permit the insertion of the sealing ring when the sealing ring is in fully contracted condition.

2. A bearing of claim 1, in which the sealing ring has a bevel on the outer corner nearest to the midlength of the socket.

3. A bearing of claim 1, in which each sealing ring when in deflected position engages the ball at an outer lip and also at an inner lip with respect to the midlength, the two lips being separated from each other by a recess in the sealing ring relative to the surface of the ball.